(12) United States Patent
Shikata

(10) Patent No.: US 7,058,221 B1
(45) Date of Patent: Jun. 6, 2006

(54) METHOD OF RECOGNIZING OBJECT BASED ON PATTERN MATCHING AND MEDIUM FOR RECORDING COMPUTER PROGRAM HAVING SAME

(75) Inventor: Hiromi Shikata, Chiba (JP)

(73) Assignee: Tani Electronics Industry Co., Ltd., Tokyo (JP)

( * ) Notice: Subject to any disclaimer, the term of this patent is extended or adjusted under 35 U.S.C. 154(b) by 399 days.

(21) Appl. No.: 09/612,548

(22) Filed: Jul. 7, 2000

(51) Int. Cl.
G06K 9/00 (2006.01)
G06K 9/64 (2006.01)

(52) U.S. Cl. .............. 382/169; 382/170; 382/278
(58) Field of Classification Search ............ 382/169, 382/170, 171, 172, 176, 278, 228
See application file for complete search history.

(56) References Cited

U.S. PATENT DOCUMENTS

| | | | | |
|---|---|---|---|---|
| 5,060,282 A | * | 10/1991 | Molley | 382/211 |
| 5,734,747 A | * | 3/1998 | Vaidyanathan | 382/170 |
| 5,748,775 A | * | 5/1998 | Tsuchikawa et al. | 382/190 |
| 5,757,953 A | * | 5/1998 | Jang | 382/132 |
| 5,790,702 A | * | 8/1998 | Yoshimura | 382/209 |
| 5,815,597 A | * | 9/1998 | Horner et al. | 382/211 |
| 6,115,505 A | * | 9/2000 | Hashima et al. | 382/286 |
| 6,240,209 B1 | * | 5/2001 | Wilcke | 382/198 |
| 6,330,361 B1 | * | 12/2001 | Mitchell et al. | 382/211 |
| 6,385,340 B1 | * | 5/2002 | Wilson | 382/218 |
| 6,389,163 B1 | * | 5/2002 | Jodoin et al. | 382/173 |

FOREIGN PATENT DOCUMENTS

JP 09-223233 * 8/1977

OTHER PUBLICATIONS

Azriel Rosenfeld et al., "Digital Picture Processing.", Published by Kindai Kagaku Sha, pp. 306-312, (1992).
Hideyuki Tamura, "Handbook of computer Picture Processing.", Published by Soken Shuppan, pp. 149-153, (1985).

* cited by examiner

Primary Examiner—Samir Ahmed
Assistant Examiner—Brian Le
(74) Attorney, Agent, or Firm—Foley & Lardner LLP

(57) ABSTRACT

A method of recognizing an object based on pattern matching using a gray-scale normalized correlation method includes storing a reference image including a foreground and a background each having a predetermined value of density distribution; inputting an image of the object which includes a foreground and a background each having a predetermined average value of density distribution; storing a function for giving the predetermined values of density distribution of the reference image equal to the predetermined average values of density distribution of the input image, respectively; and obtaining a maximum normalized correlation coefficient between the reference image and the input image using the function.

14 Claims, 8 Drawing Sheets

FOREGROUND

BACKGROUND (EXCLUDED)

FIG.11
(PRIOR ART)

SHADING

FIG.12
(PRIOR ART)

METHOD OF RECOGNIZING OBJECT BASED ON PATTERN MATCHING AND MEDIUM FOR RECORDING COMPUTER PROGRAM HAVING SAME

BACKGROUND OF THE INVENTION

The present invention relates to a technique for recognizing and detecting objects, such as fiducial mark and land, disposed on flat surfaces, such as printed circuit board and screen printing mask, based on pattern matching for positioning, measurement, and inspection.

Conventionally, pattern matching using the gray-scale normalized correlation method is often applied to recognition or detection of different objects of regular pattern in various images. This technique for matching a pattern image, i.e. a reference image for pattern matching with a corresponding input image, i.e. an image to be recognized or detected overlays the pattern image on the input image enclosed in a search frame to carry out product sum calculation for each corresponding pixel, obtaining a normalized correlation coefficient value. When calculating the normalized correlation coefficient value, the pattern image is shifted little by little with respect to the input image enclosed in the search frame to obtain its maximum value, i.e. repeated calculation processing is needed for the entire input image.

Conventional pattern matching using the normalized correlation method arises the following inconveniences:

1) With measuring apparatus based on pattern matching, fiducial marks, lands, etc. of solder levelers suffer a nonuniform density due to diffused reflection on their surface irregularities even with images subjected to image processing. Thus, when matching a pattern image derived from an original image with a corresponding input image, two images patterns with different nonuniform densities may cause lowered conformity of the density distribution therebetween to reduce a normalized correlation coefficient value, resulting in unsuccessful pattern matching.

Figure 12:
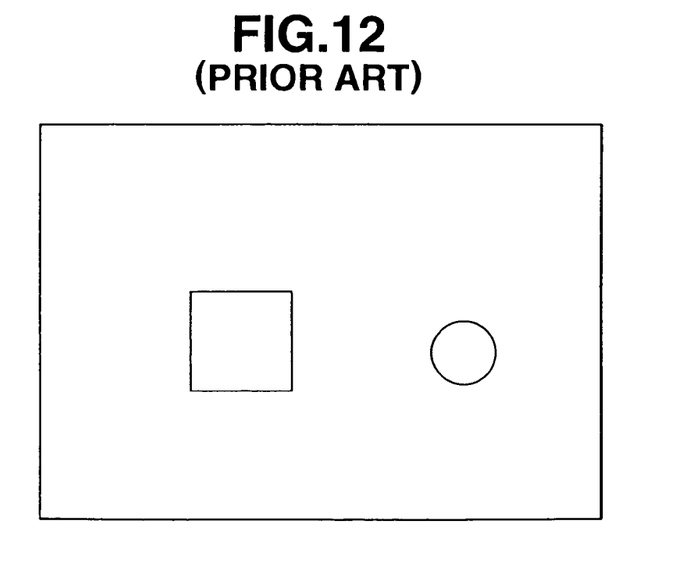
FIG. 12 is a view similar to FIG. 11, showing fiducial marks of a solder leveler.

Further, when matching an image of regular pattern with a corresponding input image, a difference in density distribution of the two images, i.e. insufficient similarity of the density distribution therebetween makes pattern matching unsuccessful. This raises a problem of difficult positional detection of a fiducial mark and a land of a solder leveler as shown in FIG. 12.

Furthermore, with conventional pattern matching, when an input image enclosed in a search frame is scanned by a pattern image, product sum processing is repeatedly carried out to obtain a particular normalized correlation coefficient value between the pattern image and the input image, necessitating enormous calculation processing time. Thus, a computer cannot carry out real time processing only with its central processing unit (CPU), requiring an exclusive fast image processing board, resulting not only in restricted development of a specific algorithm, but in increased manufacturing cost due to complex apparatus structure.

2) Conventionally, in order to detect character such as lot number, original images of the characters are previously stored as pattern images, and are subjected to pattern matching with corresponding input images of the characters. According to this method, if a substrate has shading, circuit sign drawn by silk-white paint (refer hereafter to as silk-white circuit sign), local dirt and the like on the background of an image of a character, a normalized correlation coefficient value between the pattern image and the input image is lowered considerably to disallow detection of the character.

Figure 11:
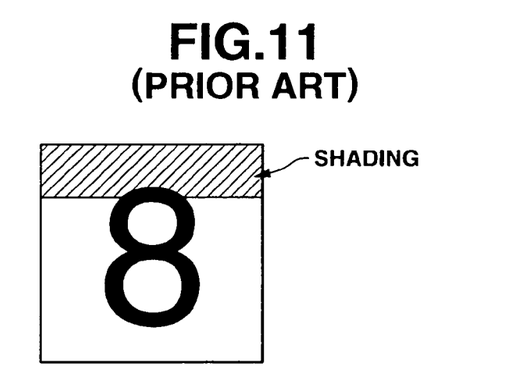
FIG. 11 is a view similar to FIG. 10, showing an input image with shading.

Referring to FIG. 11, when a black lot number is partly printed on a dark-green resist placed on a unwired layout portion of a substrate, contrast cannot fully be obtained between the black character and the dark-green background shading to reach their unification, resulting in unsuccessful recognition of the lot number. Specifically, since the ensemble of the character and the background is assumed to form one pattern, pattern matching is affected by disturbances produced on the background.

Even with some disturbances produced on the background on an input image, human eyes can recognize a character based on feature information of the foreground of the image. In order to allow detection of characters regardless of disturbed background, a novel method is demanded which ensures pattern matching with regard to only the foreground with the background excluded.

3) For detection of lands, solders, mounted parts and the like of regular pattern, their original images are stored as pattern images, and are subjected to pattern matching with corresponding input images.

If disturbance factors such as wiring layout pattern, silk-white circuit sign, resist and flux exist on the background of pattern images in the vicinity of the lands, solders, etc., the background suffers a nonuniform density or nonuniform and complex density distribution. It is noted that the wiring layout pattern can produce a complex density distribution, and the silk-white circuit sign can cause a greater density peak on the background than that on the foreground. Resist and flux can cause a nonuniform density and variations in density level on the background.

Thus, due to unsuccessful pattern matching on the background, a normalized correlation coefficient value between a pattern image and a corresponding input image is lowered to make pattern detection unsuccessful.

SUMMARY OF THE INVENTION

It is, therefore, an object of the present invention to provide a method of recognizing an object based on pattern matching, which allows stable and sure pattern detection with largely shortened processing time, simplified structure, and reduced manufacturing cost.

Another object of the present invention is to provide a medium for recording a computer program having the inventive method.

Generally, the present invention provides a method of recognizing an object based on pattern matching using a gray-scale normalized correlation method, comprising the steps of:

storing a reference image including a foreground and a background, said foreground and said background each having a predetermined value of density distribution;

inputting an image of the object, said image including a foreground and a background, said foreground and said background each having a predetermined average value of density distribution;

storing a function for giving said predetermined values of density distribution of said reference image equal to said predetermined average values of density distribution of said input image, respectively; and obtaining a maximum normalized correlation coefficient between said reference image and said input image using said function.

An aspect of the present invention is to provide a method of recognizing an object based on pattern matching using a gray-scale normalized correlation method, comprising the steps of:

storing a reference image including a foreground, said foreground having a predetermined value of density distribution;

inputting an image of the object, said image including a foreground, said foreground having a predetermined average value of density distribution;

storing a function for giving said predetermined value of density distribution of said reference image equal to said predetermined average value of density distribution of said input image; and obtaining a maximum normalized correlation coefficient between said reference image and said input image using said function.

Another aspect of the present invention is to provide a medium for recording a computer program having a method of recognizing an object based on pattern matching using a gray-scale normalized correlation method, the method comprising the steps of:

storing a reference image including a foreground and a background, said foreground and said background each having a predetermined value of density distribution;

inputting an image of the object, said image including a foreground and a background, said foreground and said background each having a predetermined average value of density distribution;

storing a function for giving said predetermined values of density distribution of said reference image equal to said predetermined average values of density distribution of said input image, respectively; and obtaining a maximum normalized correlation coefficient between said reference image and said input image using said function.

A further aspect of the present invention is to provide a medium for recording a computer program having a method of recognizing an object based on pattern matching using a gray-scale normalized correlation method, comprising the steps of:

storing a reference image including a foreground, said foreground having a predetermined value of density distribution;

inputting an image of the object, said image including a foreground, said foreground having a predetermined average value of density distribution;

storing a function for giving said predetermined value of density distribution of said reference image equal to said predetermined average value of density distribution of said input image; and obtaining a maximum normalized correlation coefficient between said reference image and said input image using said function.

DETAILED DESCRIPTION OF THE INVENTION

Referring to the drawings, preferred embodiments of the present invention will be described in detail.

An essential factor for increasing the detection ability of pattern matching comprises registration of pattern images. The shape of a pattern image as well as the density distribution of the foreground and background thereof is the key for increasing conformity of pattern matching between a pattern image and a corresponding input image.

Figure 8A:
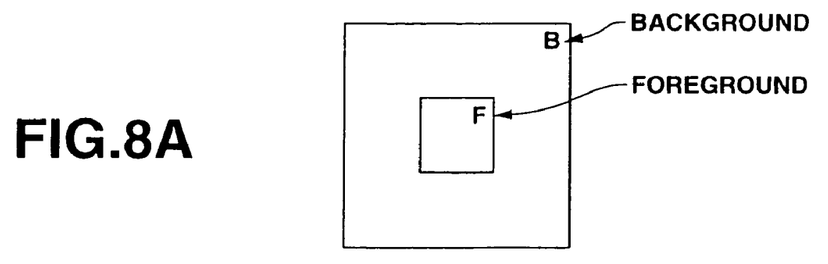
FIG. 8A is a schematic plan view showing a pattern image with foreground and background.
Figure 9A:
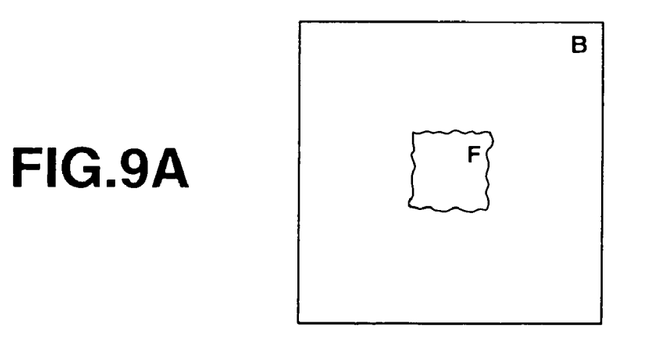
FIG. 9A is a view similar to FIG. 8A showing an input image with foreground and background.

According to the equation of definition of the normalized correlation coefficient Cr, achievement of high conformity (Cr=I) requires that the shape and area or size of the foreground of a pattern image, i.e. a reference image for pattern matching are substantially equal to those of the foreground of a corresponding input image, i.e. an image to be recognized or detected. In this connection, refer to the relation between images as shown in FIGS. 8A and 9A.

Figure 8B:
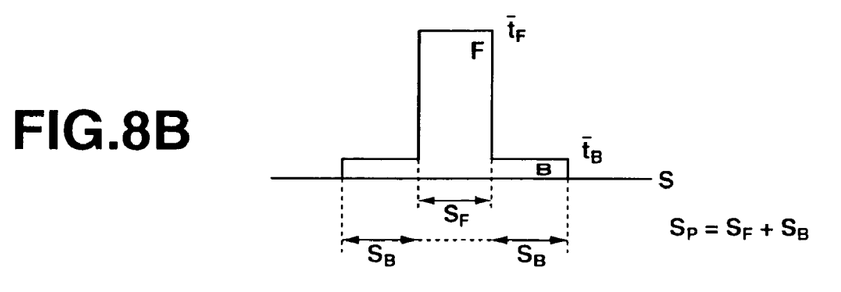
FIG. 8B is a graph illustrating a characteristic curve of the density distribution for the pattern image of FIG. 5A.
Figure 9B:
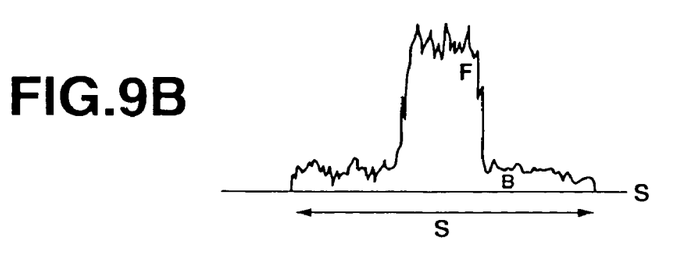
FIG. 9B is a graph illustrating a characteristic curve of the density distribution for the input image of FIG. 9A.

With regard to the density distribution, only similarity is needed between the foreground and the background of a pattern image and those of a corresponding input image. In this connection, refer to the relation between graphical forms as shown in FIGS. 8B and 9B.

If density noise occurs due to diffused reflection on a solder leveler, for example two images patterns with different nonuniform densities of a pattern image and a corresponding input image may cause lowered similarity of the density distribution therebetween, resulting in unsuccessful pattern matching.

Then, in order to smooth noise of the foreground and background of the pattern image, average densities of the foreground and background of the pattern image are set in connection with the density distribution, respectively. A density distribution function using the average densities takes a higher constant value in the domain of the foreground, and a lower constant value in the domain of the background, providing a function of plateau-like or rectangular section form as shown in 8B. This function is suitable for models of fiducial marks and lands having regular shape, constant surface properties, and uniform density in nature.

Alternatively, the density distribution function may take a lower constant value in the domain of the foreground, and a higher constant value in the domain of the background to provide inverted density distribution form.

With the use of the plateau-like function, product sum calculation of pixel values of a pattern image and a corresponding input image upon calculation of the normalized correlation coefficient Cr can be reduced to summation of pixel values of the input image, achieving also smoothed and averaged noise of the input image. That is, implementation of pattern matching with noise smoothed contributes to a great improvement in the detection ability of pattern matching with high noise resistance.

Figure 1:
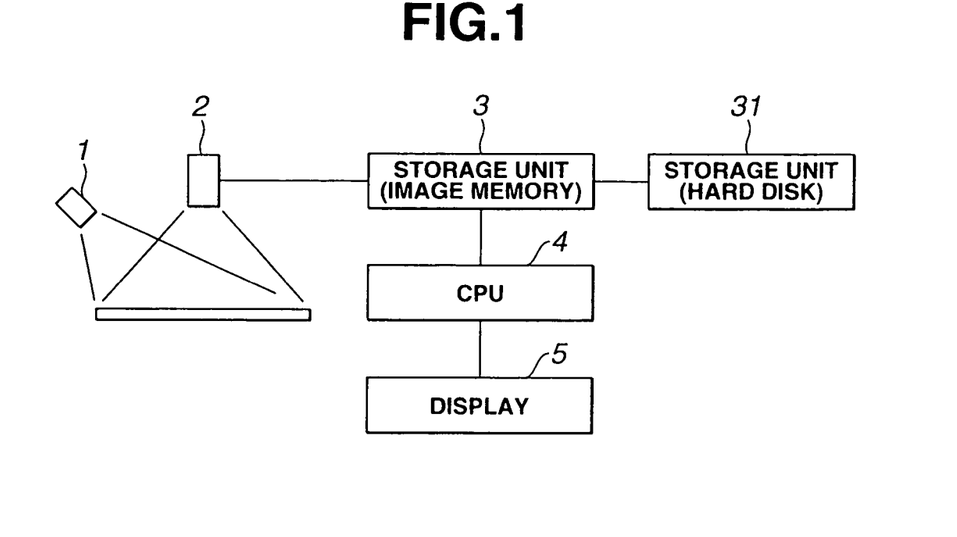
FIG. 1 is a block diagram showing a system for realizing a method of recognizing an object based on pattern matching according to the present invention.

Referring to FIG. 1, in illustrative embodiments of the present invention, a system comprises a lighting unit 1 for lighting an object to be recognized or detected, an image capture device 2, such as camera, for taking images such as pattern image and object to be recognized such as fiducial mark, a first storage unit or image memory 3 for taking in the images, a second storage unit or hard disk 31 for storing the images held in the first storage unit 3, a central processing unit (CPU) 4 for carrying out pattern matching processing with the images in accordance with a computer program, and a display 5 for displaying the images.

Figure 2:
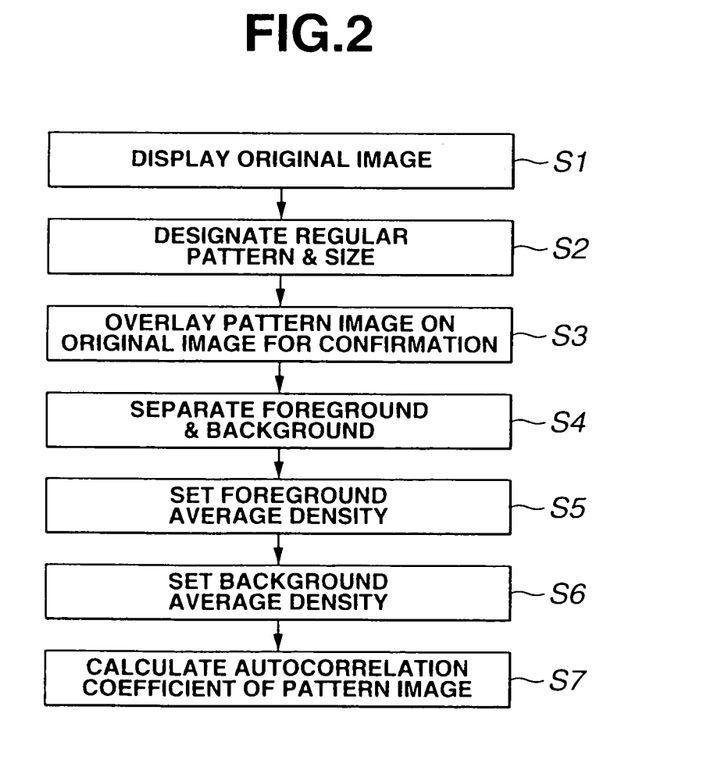
FIG. 2 is a flowchart showing operation of an embodiment with regard to an image of regular pattern.
Figure 3:
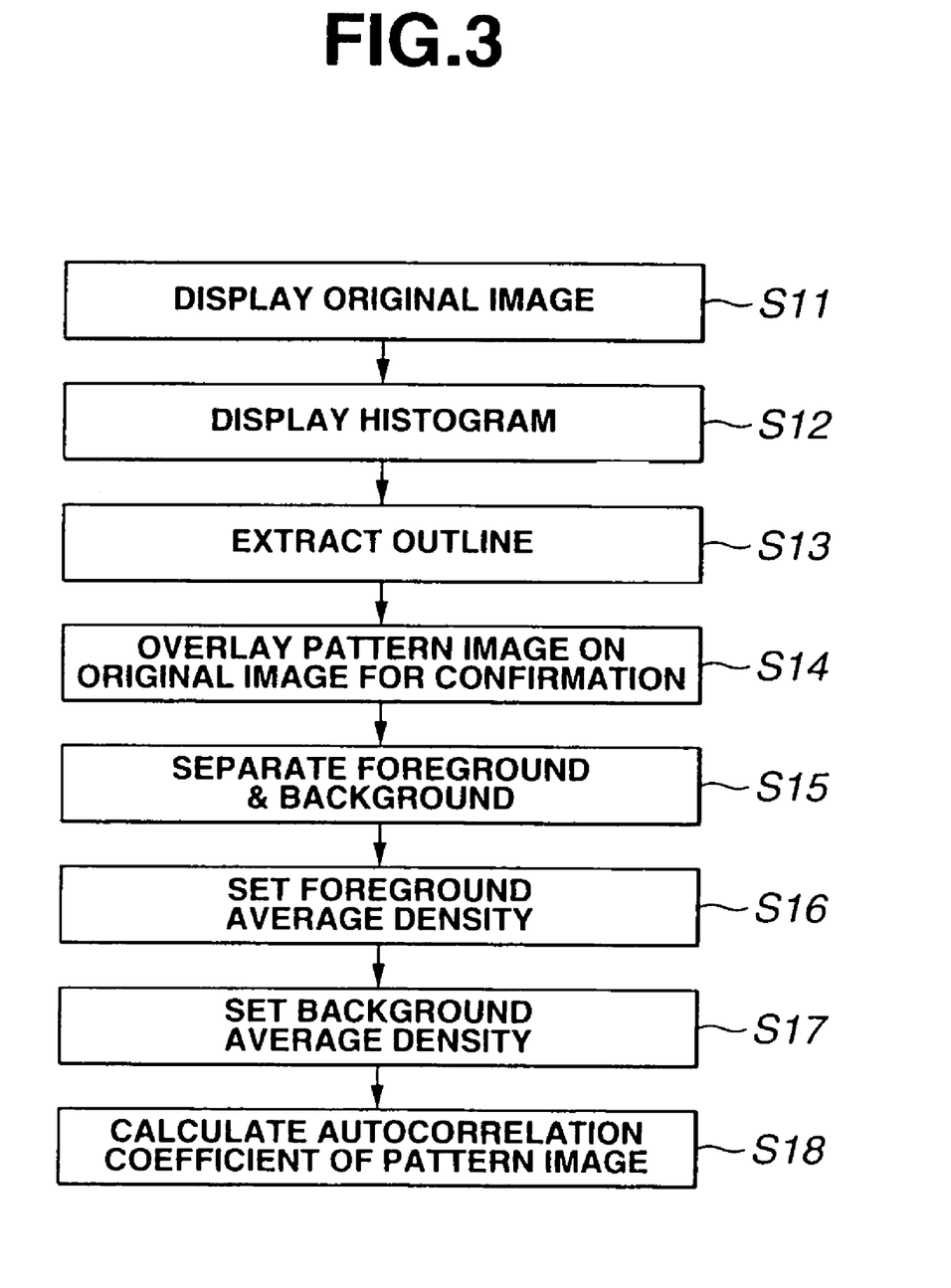
FIG. 3 is a view similar to FIG. 2, showing operation of the embodiment with regard to an image of arbitrary shape pattern.
Figure 4:
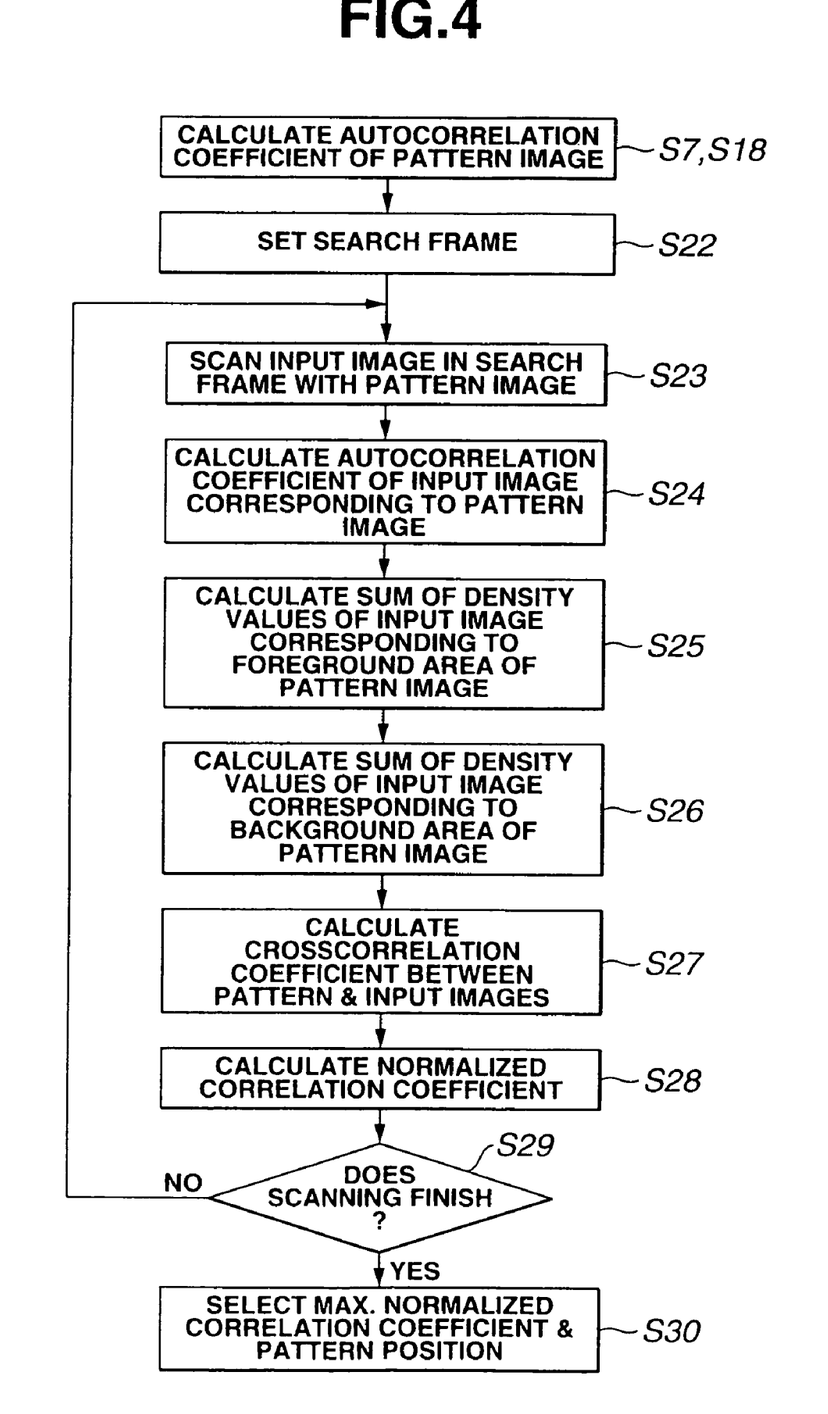
FIG. 4 is a view similar to FIG. 3, showing operation of the embodiment with regard to pattern matching.

Referring to FIGS. 2–4, there are shown registration processing for a pattern image of an object of regular pattern, registration processing for a pattern image of an object of arbitrary shape pattern, and pattern matching processing between a pattern image and a corresponding input image, respectively.

Referring to FIG. 2, when an object to be recognized is of the regular pattern, an original image of the object is displayed (S1). A corresponding regular pattern is selected from a previously stored list of regular patterns comprising square, rectangle, circle, oval, rhombus, polygon, etc. and the size of which is designated (S2). Designation of the size is carried out by designating a representative point of the regular pattern or by setting a size parameter. For example, when the regular pattern is a circle, the center and a circumferential point may be designated, while when the regular pattern is of the complex shape, a polygon may be used.

Then, an image of the selected regular pattern is overlaid on the original image of the object to confirm shape conformity therebetween (S3), and the foreground and background of the pattern image are separated from each other (S4). For the density of the foreground and background, there is a need to set an average density of each (S5, S6). The average density of the foreground is obtained, as a default, by averaging the density of the inside of the pattern image overlaid on the original image. The average density of the background is obtained by averaging the density of the outside of the pattern image. Optionally, the density of the foreground and background of the pattern image may be changed. Subsequently, an autocorrelation coefficient of the pattern image is calculated to use in calculation of the normalized correlation coefficient Cr (S7).

Referring to FIG. 3, when an object to be recognized is of the arbitrary shape pattern, i.e. of the shape which is not given on the previously stored list, registration processing is fundamentally the same as that shown in FIG. 2 except processing carried out at steps S12 and S13. Specifically, at the step S12, a histogram of an original image of the object is displayed. The histogram provides a distribution of brightness (1–256) of pixels of the original image. On the original image, the foreground has a peak in a lighter area of the distribution of brightness, whereas the background has a peak in a darker area of the distribution of brightness. And at the step S13, the outline of the original image is obtained by separating the foreground from the background according to a binarization method resulting from setting of a threshold of the brightness of the original image, or by extracting the outline in accordance with first-order and second-order differentiations.

Referring to FIG. 4, after calculating the autocorrelation coefficient of the pattern image (S7; S18), a search frame is set for the input image (S22), and the input image enclosed in the search frame is scanned by the pattern image to detect the foreground (S23). In the process of scanning, calculation is made to obtain an autocorrelation coefficient of the input image corresponding to the pattern image (S24). And calculation is made to obtain a sum of density values of the input image corresponding to the foreground area of the pattern image (S25), and to obtain a sum of density values of the input image corresponding to the background area of the pattern image (S26).

Then, calculation is made to obtain a cross-correlation coefficient between the pattern image and the input image (S27). The normalized correlation coefficient Cr is calculated by dividing the cross-correlation coefficient by the product of the autocorrelation coefficient of the pattern image and that of the input image.

Generally, the cross-correlation coefficient is obtained by product sum calculation of pixel values of the pattern image and the input image. In this case, because of being given by the rectangular-section function, the density distribution of the pattern image has constant values in the domains of the foreground and the background, only need is summation of pixel values of the input image.

A reduction of product sum calculation of pixel values of the pattern image and the input image to summation of pixel values of the input image contributes to not only smoothed noise as described above, but largely shortened calculation time. Particularly, a reduction in time for calculation of the cross-correlation coefficient which is repeatedly carried out in the process of scanning results in a large reduction in processing time for pattern matching.

When scanning is finished (S29), selection is made to obtain a maximum value of the normalized correlation coefficient Cr and a position of the pattern image (S30). It is noted that the position of the pattern image corresponds to a pattern detected position.

Generally, calculation of the normalized correlation coefficient Cr is depicted in "Digital Picture Processing" by Azriel Rosenfeld & Avinash C. Kak, pages 306–312, published by Kindai Kagaku Sha in 1992, the teachings of which are incorporated hereby by reference. The following is an example of a movement normalized correlation with no average values subtracted. The normalized correlation coefficient Cr is expressed by an equation (1):

$$Cr = \int_{Sp} f \cdot t \, dS / (\int_{Sp} f^2 \, dS \cdot \int_{Sp} t^2 \, dS)^{1/2} \qquad (1)$$

where S is a domain of definition of the integral, f is a density distribution function of an input image, and t is a density distribution function of the pattern image, and where $\int_{Sp} f \cdot t \, dS$ is a cross-correlation coefficient between the input image and the pattern image, $\int_{Sp} f^2 \, dS$ is an autocorrelation coefficient of the input image, and $\int_{Sp} t^2 \, dS$ is an autocorrelation coefficient of the pattern image and is constant.

As for a domain of definition Sp in the pattern image given in the equation (1), refer to FIG. 8B.

Using equations (2)–(4), the normalized correlation coefficient Cr can be expressed by an equation (5):

$$\|fz - t\|^2 = \int_S (fz - t)^2 \, dS = (\int_S f^2 \, dS) z^2 - 2(\int_S f \cdot t \, dS) z + \int_S t^2 \, dS \geq 0 \qquad (2)$$

where z is a variable.

$$\text{Discrimination function } D = (f \cdot t \, dS)^2 - \int f^2 \, dS \cdot \int t^2 \, dS \leq 1 \qquad (3)$$

$$\therefore (\int f \cdot t \, dS)^2 \leq \int f^2 \, dS \cdot \int t^2 \, dS \qquad (4)$$

where equality is obtained when fz−t=0.

Normalized correlation coefficient $$Cr = \int f \cdot t \, dS / (\int f^2 \, dS \cdot \int t^2 \, dS)^{1/2} \leq 1 \qquad (5)$$

where equality is obtained when t=fz (t ∽ f, i.e. t is similar to f).

As seen from the equation (5) when equality is obtained, if the density distribution function t of a pattern image is similar to that f of an input image, i.e. t ∽ f, the normalized correlation coefficient Cr is equal to 1 (maximum). It is thus desirable that the density distribution function t of a pattern image is similar to average values of density distribution of the foreground and background of an input image. Therefore, referring to FIG. 8B, the density distribution function t of a pattern image is set to average values tF, tB of density distribution of the foreground and background of an original image of the pattern image.

Thus, the cross-correlation coefficient between the input image and the pattern image in the equation (1) can be transformed into an equation (6):

$$\int_{S_P} f \cdot t\, dS = \int_{S_F} f \cdot t\, dS + \int_{S_B} f \cdot t\, dS = \bar{t}_F \int_{S_F} f\, dS + \bar{t}_B \int_{S_B} f\, dS \qquad (6)$$

where $\bar{t}_F$ and $\bar{t}_B$ are constant.

As seen from the equation (6), the cross-correlation coefficient discretized to product sum calculation becomes the integral of the density distribution function f of the input image discretized to summation, achieving smoothed noise, allowing pattern matching without being affected by noise.

Discretization of the equation (6) by pixels provides an equation (7):

$$\sum_{i=1}^{N} fi \cdot ti = \bar{t}_F \sum_{i \in B} fi + \bar{t}_B \sum_{i \in B} fi \qquad (7)$$

As seen from the equation (7), product sum calculation of the density distribution functions f, t of the input image and the pattern image can be reduced to summation thereof, resulting in high-speed calculation.

Likewise, product sum calculation of the normalized correlation coefficient Cr with average values subtracted can be reduced to summation, obtaining the same effect.

As described above, an essential factor for increasing the detection ability of pattern matching comprises registration of pattern images. The shape of a pattern image as well as the density distribution of the foreground and background thereof is the key for increasing conformity of pattern matching between a pattern image and a corresponding input image.

According to the equation of definition of the normalized correlation coefficient Cr, achievement of high conformity (Cr=I) requires that the shape of the foreground of a pattern image is substantially equal to that of the foreground of a corresponding input image, and that the density distribution of the pattern image is similar to that of the input image.

The background of printed circuit boards may have various disturbances such as wiring layout pattern, silk-white circuit sign, partial dirt, resist, flux, etc., so that during pattern matching of regular lands, solders, mounted parts and lot numbers, non-matching occurs in the background of a pattern image and a corresponding input image. Thus, conformity is lowered as a whole to reduce a normalized correlation coefficient value, resulting in unsuccessful pattern matching.

In order to reduce a bad influence of disturbances, with the foreground and background of a pattern image being separated to remove the background, pattern matching is carried out, preferably, with regard to the foreground only.

For this purpose, the density distributions of the foreground and background of the pattern image are separated at a stage of registration thereof.

Figure 5:
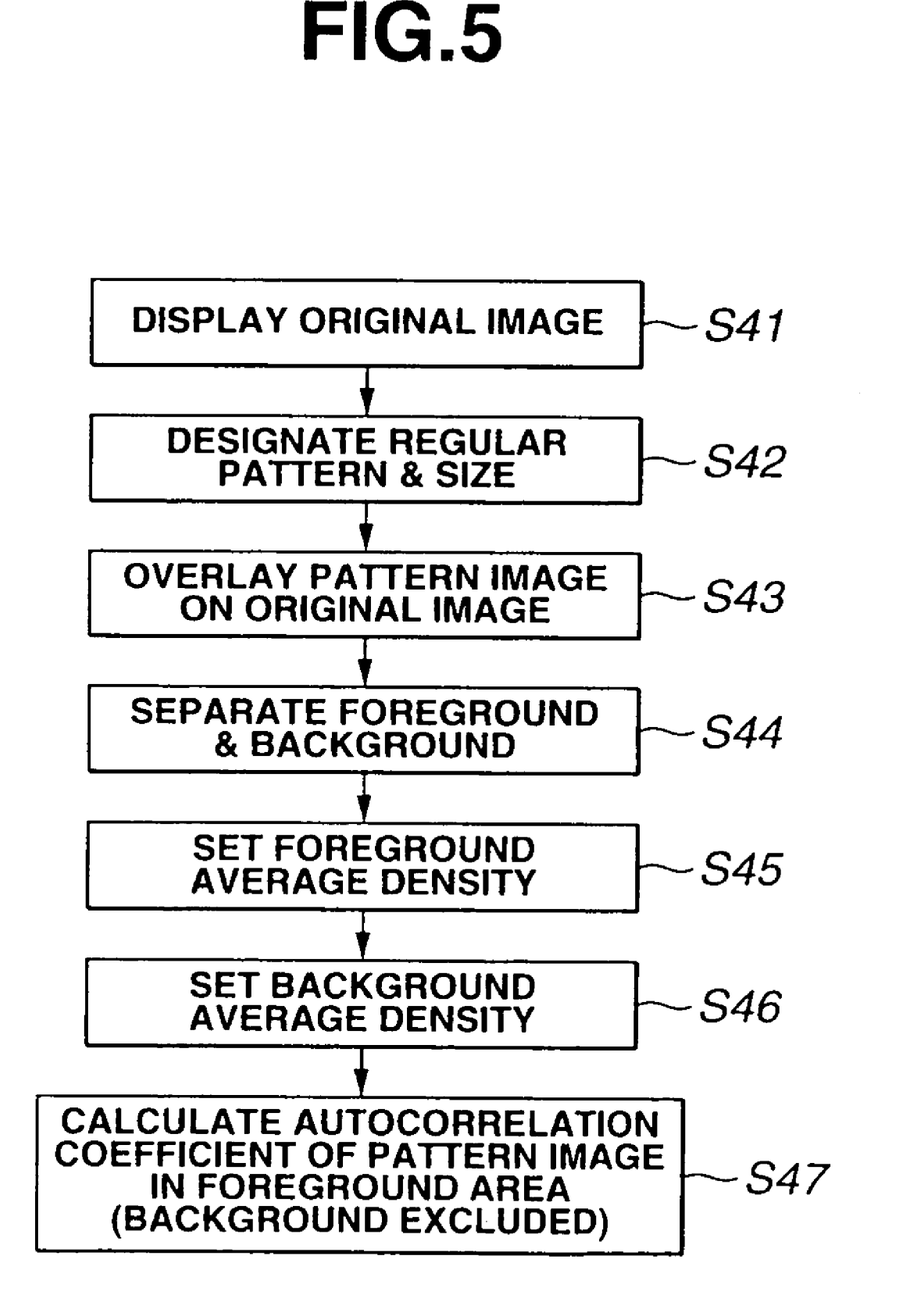
FIG. 5 is a view similar to FIG. 4, showing another embodiment of the present invention with regard to an image of regular pattern.
Figure 6:
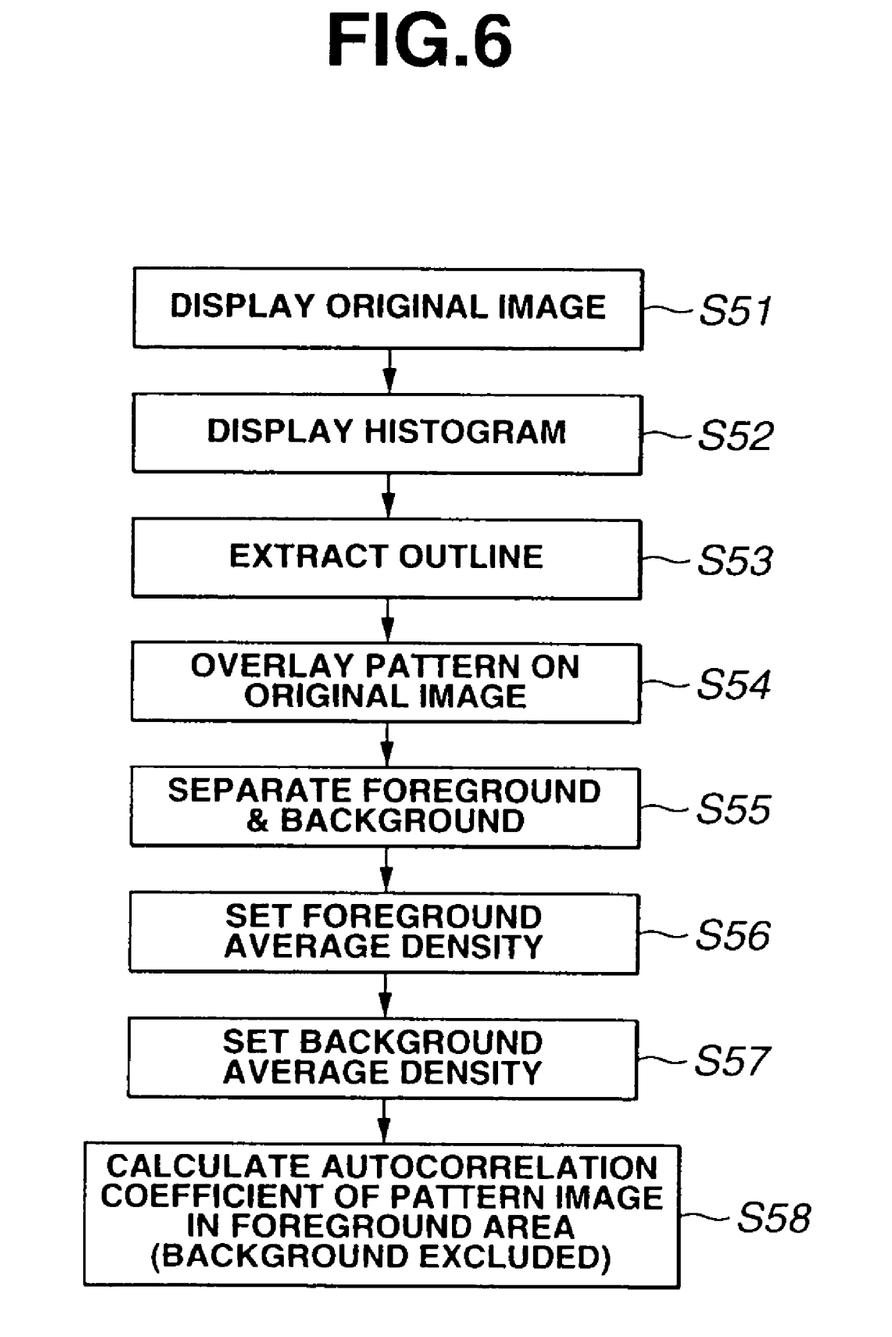
FIG. 6 is a view similar to FIG. 5, showing operation of another embodiment with regard to an image of arbitrary shape pattern.
Figure 7:
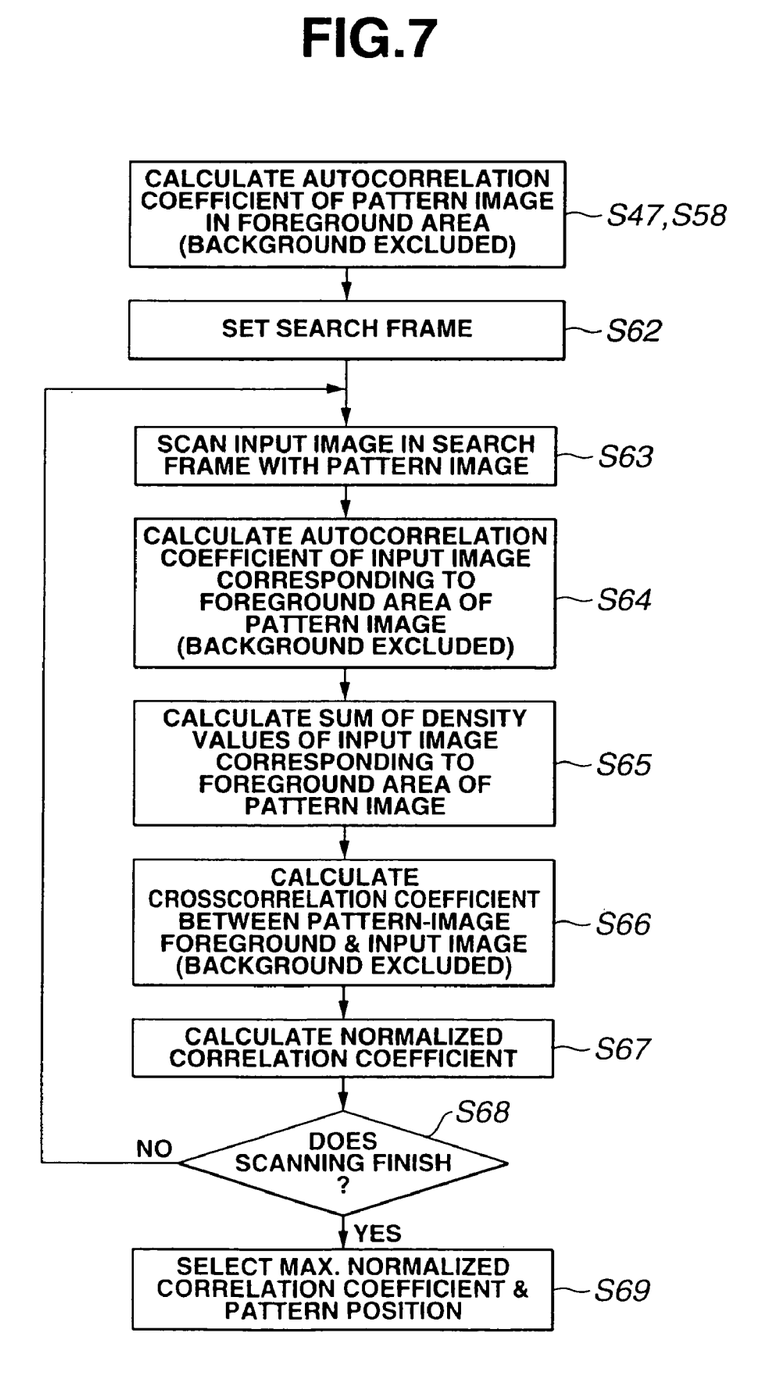
FIG. 7 is a view similar to FIG. 6, showing operation of another embodiment with regard to pattern matching.

In other illustrative embodiments of the present invention, recognition is carried out using the system as shown in FIG. 1. Referring to FIGS. 5–7, there are shown registration processing for a pattern image of an object of regular pattern such as regular land, solder, mounted part or the like, registration processing for a pattern image of an object of arbitrary shape pattern or characters, and pattern-matching processing between a pattern image and a corresponding input image, respectively.

Referring to FIGS. 5–6, registration processing is substantially the same as that as shown in FIGS. 2–3. First, an original image of an object to be recognized is displayed (S41; S51). When the object is of the regular pattern, a corresponding regular pattern is selected from a previously stored list of regular patterns comprising square, rectangle, circle, oval, rhombus, polygon, etc. By designating the size of the regular pattern and the density of the inside and outside thereof (S42), the foreground and background of a pattern image are separated from each other (S44). When the object is of the arbitrary shape pattern, by means of outline separation (S53), the foreground and background of a pattern image are separated from each other (S55).

In order to obtain smoothed noise and high-speed calculation of a correlation coefficient, an average density of an original image is designated with regard to the foreground and background thereof (S46, S46; S56, S57). Alternatively, due to background information excluded, the density may be designated such that the foreground is 1, and the background is 0. Optionally, it is possible to use the density distribution of an original image or the density distribution defined by a user.

Subsequently, an autocorrelation coefficient of the pattern image is calculated to use in calculation of the normalized correlation coefficient Cr (S47; S58). Since pattern matching is carried out with regard to only the foreground of the pattern image with the background excluded, an autocorrelation coefficient of the pattern image is calculated with regard to the foreground only, i.e. the foreground area of the pattern image (S47; S58).

This forms a mask for the background of the pattern image. Unlike a fixed mask for a particular portion of an input image, this mask is a kind of automatic mask which allows pattern matching with regard to only the foreground with the background masked during scanning of an input image enclosed in a search frame by a pattern image.

Referring to FIG. 7, after calculating the autocorrelation coefficient of the pattern image (S47; S58), a search frame is set for the input image (S62), and the input image enclosed in the search frame is scanned by the pattern image to detect the foreground (S63). In the process of scanning, calculation is made to obtain an autocorrelation coefficient of the input image corresponding to the foreground area of the pattern image (S64). And calculation is made to obtain a sum of density values of the input image corresponding to the foreground area of the pattern image (S65).

Then, calculation is made to obtain a cross-correlation coefficient between the foreground area of the pattern image and the input image (S66). The normalized correlation coefficient Cr is calculated by dividing the cross-correlation coefficient by the product of the autocorrelation coefficient of the pattern image and that of the input image. Due to the background removed from the pattern image, pattern matching is ensured with bad influence of disturbances on the background minimized, resulting in shortened calculation time.

When scanning Is finished (S68), selection is made to obtain a maximum value of the normalized correlation coefficient Cr and a position of the pattern image (S69). It is noted that the position of the pattern image corresponds to a pattern detected position.

Figure 10:
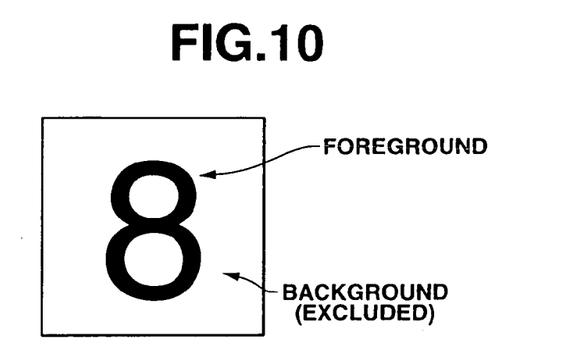
FIG. 10 is a view similar to FIG. 9A, showing a further embodiment of the present invention.

Referring to FIGS. 10–11, in the embodiments, as being carried out with regard to a pattern image with the background excluded or masked as shown in FIG. 10, pattern matching is less influenced by shading placed on the background of the input image as shown in FIG. 11.

The normalized correlation coefficient Cr is expressed by the above equation (1). Since the density distributions of the foreground and background of the pattern image have constant average values, respectively, the cross-correlation coefficient is expressed by an equation (8):

$$\int_{Sp} f \cdot t dS = \bar{t} F \int_{SF} f dS + \bar{t} B \int_{SB} f dS \quad (8)$$

Foreground Background (Ignored)

Due to the background removed from a pattern image, a term of the background is ignored in the equation (8).

The autocorrelation coefficients are expressed by equations (9) and (10), respectively:

$$\int_{Sp} f^2 dS = \int_{SF} f^2 dS + \int_{SB} f^2 dS \quad (9)$$

Foreground Background
(Variant)

$$\int_{Sp} t^2 dS = \bar{t} F^2 sF + \bar{t} B^2 SB = \text{const} \quad (10)$$

Foreground Background (Ignored)

A term of the background is ignored in the equation (10).

Thus, the normalized correlation coefficient Cr can be expressed by an equation (11) including only a term of the foreground with a term of the background excluded, allowing restrained bad influence of disturbances on the background and fast pattern-matching processing.

$$Cr = \bar{t} F \int_{SF} f dS / (\int_{SF} f^2 dS - \bar{t} F^2 SF)^{1/2} = \int_{SF} f^2 dS \cdot SF)^{1/2} \rightarrow \max \quad (11)$$

Likewise, the equation of the normalized correlation coefficient Cr with average values subtracted can be reduced to the equation including only a term of the foreground with a term of the background excluded, obtaining the same effect.

The inventive method allows real time pattern matching by means of processing in the CPU in a software way without using an exclusive fast image processing board, contributing to simplified apparatus structure and reduced manufacturing cost. Of course, the inventive method can be recorded as a computer program on readable recording media such as floppy disk and CD-ROM for various applications.

Having described the present invention in connection with the preferred embodiments, it is noted that the present invention is not limited thereto, and various changes and modifications can be made without departing from the scope of the present invention.

The entire contents of Japanese Patent Application P9-354322 are incorporated hereby by reference.

What is claimed is:

1. A method of recognizing an object based on pattern matching using a gray-scale normalized correlation method, comprising:
   storing a reference image including a foreground and a background, the foreground and the background providing a predetermined contrast pattern;
   inputting an image of the object, the image including a foreground and a background, the foreground and the background providing a predetermined contrast pattern;
   obtaining a function for giving the predetermined contrast pattern of the reference image corresponding to the predetermined contrast pattern of the input image, the function providing a predetermined form pattern, the predetermined form pattern including a rectangular pattern; and
   calculating a normalized correlation coefficient between the reference image and the input image using the function, the calculating step comprising:
   calculating an autocorrelation coefficient of the reference image by assigning a density distribution value of a background area of the reference image to a first constant value and by assigning a density distribution value of a foreground area of the reference image to a second constant value different from the first constant value;
   calculating a cross correlation coefficient between the reference image and the input image for the foreground and the background areas; and
   obtaining the normalized correlation coefficient by dividing the cross correlation coefficient by a product of the autocorrelation coefficients of the input image and the reference image.

2. The method as claimed in claim 1, wherein the obtaining step is carried out by designating a pattern of the reference image, overlaying an image of the pattern on the input image, and designating one of a density distribution of the image and a density of the image.

3. The method as claimed in claim 1, wherein the obtaining step is carried out by extracting an outline of the object wherein an area inside the outline serves as the foreground and an area outside the outline serves as the background, overlaying an image of the outline on the input image, and designating one of a density distribution of the image and a density of the image.

4. The method as claimed in claim 1, wherein the calculating step further comprises:
   calculating a sum of density values of the input image corresponding to the foreground area of the reference image.

5. The method as claimed in claim 4, wherein the calculating step further comprises:
   calculating an autocorrelation coefficient of the reference image;
   calculating a sum of density values of the input image corresponding to the background area of the reference image;
   obtaining the normalized correlation coefficient by dividing the cross correlation coefficient by a product of the autocorrelation coefficients of the input image and the reference image.

6. The method as claimed in claim 5, wherein the step of calculating an autocorrelation coefficient of the reference image is performed by assigning a density distribution value of a background area of the reference image to a first constant value and by assigning a density distribution value of a foreground area of the reference image to a second constant value different from the first constant value.

7. The method as claimed in claim 1, wherein the autocorrelation coefficient and the cross correlation coefficient of the reference image are calculated with the background area of the reference image removed.

8. A computer readable medium for storing a computer program that is capable of recognizing an object based on pattern matching using a gray-scale normalized correlation method, the computer program, when executed on a computer, causing the computer to perform the steps of:

storing a reference image including a foreground and a background, the foreground and the background providing a predetermined contrast pattern;

inputting an image of the object, the image including a foreground and a background, the foreground and the background providing a predetermined contrast pattern;

obtaining a function for giving the predetermined contrast pattern of the reference image corresponding to the predetermined contrast pattern of the input image, the function providing a predetermined form pattern, the predetermined form pattern a rectangular pattern; and calculating a normalized correlation coefficient between the reference image and the input image using the function, the calculating step comprising:

calculating an autocorrelation coefficient of the reference image by assigning a density distribution value of a background area of the reference image to a first constant value and by assigning a density distribution value of a foreground area of the reference image to a second constant value different from the first constant value;

calculating a cross correlation coefficient between the reference image and the input image for the foreground and the background areas; and obtaining the normalized correlation coefficient by dividing the cross correlation coefficient by a product of the autocorrelation coefficients of the input image and the reference image.

9. The computer readable medium as claimed in claim 8, wherein the obtaining step is carried out by designating a pattern of the reference image, overlaying an image of the pattern on the input image, and designating one of a density distribution of the image and a density of the image.

10. The computer readable medium as claimed in claim 8, wherein the obtaining step is carried out by extracting an outline of the object wherein an area inside the outline serves as the foreground and an area outside the outline serves as the background, overlaying an image of the outline on the input image, and designating one of a density distribution of the image and a density of the image.

11. The computer readable medium as claimed in claim 8, wherein the autocorrelation coefficient of the reference image is calculated with the background area of the reference image removed.

12. The computer readable medium as claimed in claim 8, wherein the calculating step further comprises:

calculating a sum of density values of the input image corresponding to the foreground area of the reference image; and calculating a sum of density values of the input image corresponding to the background area of the reference image.

13. A method of recognizing an object based on pattern matching using a grayscale normalized correlation method, comprising:

storing a reference image including a foreground and a background, the foreground and the background providing a predetermined contrast pattern;

inputting an image of the object, the image including a foreground and a background, the foreground and the background providing a predetermined contrast pattern;

obtaining a function for giving the predetermined contrast pattern of the reference image corresponding to the predetermined contrast pattern of the input image, the function providing a predetermined form pattern, the predetermined form pattern including a rectangular pattern; and calculating a normalized correlation coefficient between the reference image and the input image using the function, the calculating step comprising:

calculating an autocorrelation coefficient of the reference image by assigning a density distribution value of a background area of the reference image to a first constant value and by assigning a density distribution value of a foreground area of the reference image to a second constant value different from the first constant value;

calculating a sum of density values of the input image corresponding to the foreground area of the reference image;

calculating a sum of density values of the input image corresponding to the background area of the reference image;

calculating a cross correlation coefficient between the reference image and the input image for the foreground and the background areas; and obtaining the normalized correlation coefficient by dividing the cross correlation coefficient by a product of the autocorrelation coefficients of the input image and the reference image.

14. A computer readable medium for storing a computer program that is capable of recognizing an object based on pattern matching using a gray-scale normalized correlation method, the computer program, when executed on a computer, causing the computer to perform the steps of:

storing a reference image including a foreground and a background, the foreground and the background providing a predetermined contrast pattern;

inputting an image of the object, the image including a foreground and a background, the foreground and the background providing a predetermined contrast pattern;

obtaining a function for giving the predetermined contrast pattern of the reference image corresponding to the predetermined contrast pattern of the input image, the function providing a predetermined form pattern, the predetermined form pattern including a rectangular pattern; and calculating a normalized correlation coefficient between the reference image and the input image using the function, the calculating step comprising:

calculating an autocorrelation coefficient of the reference image by assigning a density distribution value of a background area of the reference image to a first constant value and by assigning a density distribution value of a foreground area of the reference image to a second constant value different from the first constant value;

calculating a sum of density values of the input image corresponding to the foreground area of the reference image;

calculating a sum of density values of the input image corresponding to the background area of the reference image;

calculating a cross correlation coefficient between the reference image and the input image for the foreground and the background areas; and obtaining the normalized correlation coefficient by dividing the cross correlation coefficient by a product of the autocorrelation coefficients of the input image and the reference image.

* * * * *